United States Patent
Merriam

[15] 3,661,673
[45] May 9, 1972

[54] METHOD OF MAKING PLASTIC LAMINATE HAVING HIGH ABRASION RESISTANCE

[72] Inventor: John B. Merriam, Carpentersville, Ill.
[73] Assignee: Woodall Industries Inc.
[22] Filed: May 1, 1969
[21] Appl. No.: 820,993

[52] U.S. Cl.................156/279, 156/297, 117/16, 161/168
[51] Int. Cl........................................B32b 31/00
[58] Field of Search............156/279, 297, 298; 117/16; 161/168

[56] References Cited

UNITED STATES PATENTS

| | | | |
|---|---|---|---|
| 2,806,509 | 9/1957 | Bozzacco et al. | 156/279 X |
| 3,249,458 | 5/1966 | Cornell et al. | 156/279 X |
| 3,525,664 | 8/1970 | Hale et al. | 156/279 X |

Primary Examiner—Carl D. Quarforth
Assistant Examiner—Stephen J. Lechert, Jr.
Attorney—Harness, Dickey & Pierce

[57] ABSTRACT

A process for making a resin impregnated laminated sheet material and the resultant laminate produced therefrom which is provided with an abrasion-resistant surface layer comprising a cured resin incorporating a controlled quantity of substantially spherically shaped transparent glass beads of controlled size which are distributed substantially uniformly through the surface layer.

5 Claims, 2 Drawing Figures

Patented May 9, 1972

3,661,673

INVENTOR.
John B. Merriam
BY
Harness, Dickey & Pierce
ATTORNEYS.

3,661,673

METHOD OF MAKING PLASTIC LAMINATE HAVING HIGH ABRASION RESISTANCE

BACKGROUND OF THE INVENTION

Resin-impregnated sheet materials of the type to which the present invention is applicable are in widespread commercial use as decorative structural materials, such as paneling, counter and table tops, furniture surfaces, and the like. Conventionally, materials of this type comprise one or more fibrous or woven sheet materials, such as paper, linen, canvas, etc., which are impregnated or saturated with a thermosetting-type resin. Usually, the sheets are provided with an imprinted layer adjacent to their exposed face for enhancing the decorative appearance of the material. An important characteristic of such laminated materials is their wear or abrasion resistance. Heretofore, it was considered necessary in order to achieve optimum abrasion resistance to utilize the so-called "high pressure" laminating technique for manufacturing such resin-impregnated sheet materials. This latter method possesses certain inherent disadvantages and lacks adequate processing flexibility and versatility, detracting from the economics of the sheet material produced.

In accordance with the discovery comprising the present invention, laminated-type sheet materials can now be satisfactorily made in accordance with a low pressure continuous process in which the resultant sheets possess excellent surface abrasion resistance, as well as possessing a smooth or textured decorative finish.

SUMMARY OF THE INVENTION

The advantages and benefits of the present invention are achieved by applying, to at least one face surface of a base sheet, a surface coating comprising a thermosetting resin incorporating from about 25 parts up to about 300 parts by weight, based on 100 parts by weight of the resin, of substantially spherically shaped transparent solid glass beads which are of a controlled particle size and are distributed substantially uniformly through the coating. In accordance with a preferred embodiment of the present invention, the base sheet is composed of one or more plies of woven or fibrous sheeting which has been impregnated with a thermosetting resin and which base sheet is concurrently cured with the surface coating incorporating the glass beads therein, forming a composite tenaciously bonded laminate. The exterior face of the surface coating can be alternately provided with a smooth or textured finish by controlling the size and/or the quantity of the glass beads employed and/or the shrinkage characteristics of the thermosetting resin in which they are dispersed. The present invention also encompasses a decorative sheet material having at least one abrasion-resistant surface which may also be provided with a suitable texture and which can be economically manufactured in accordance with the method of the present invention.

Other advantages and benefits of the present invention will become apparent upon a reading of the description of the preferred embodiments taken in conjunction with the accompanying drawing.

DESCRIPTION OF THE PREFERRED EMBODIMENTS

Figure 1:
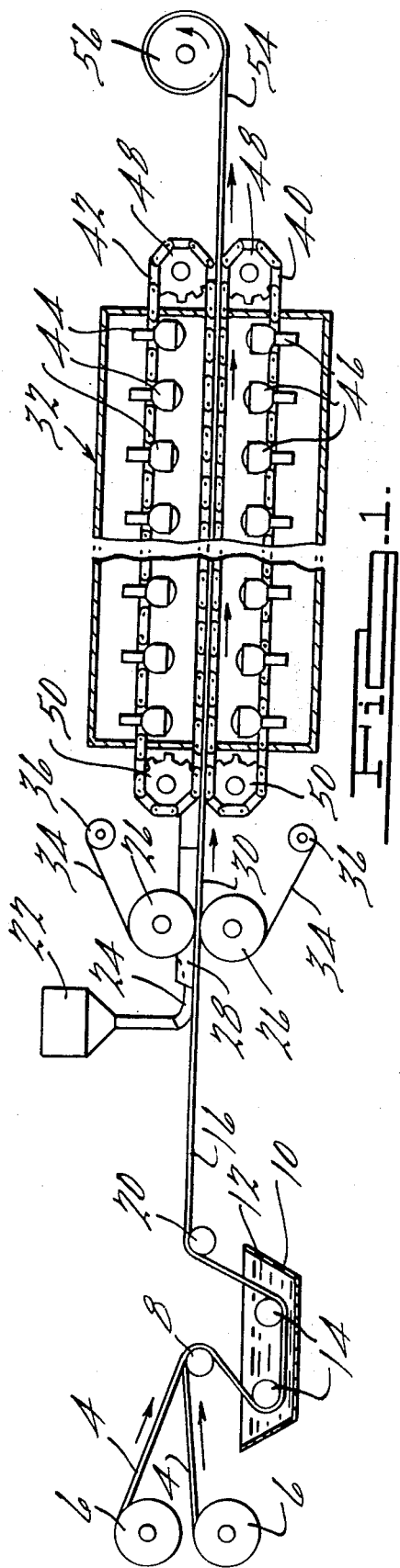
FIG. 1 is a schematic side elevational view of a typical arrangement of the components of an apparatus for practicing the method of the present invention in accordance with a preferred form of the invention in which the sheet material is made in a continuous manner and of indefinite length.

Referring now in detail to the drawing, and as may be best seen in FIG. 1, the sheet material is manufactured in a continuous manner in which the base sheet to which the wear- and abrasion-resistant surfaces coating is applied is concurrently formed from a plurality of resin-impregnated plies which are concurrently cured with the surface coating. In the specific embodiment illustrated, two sheet or plies 4 are continuously unwound from supply rolls 6 and extend therefrom around an idler roller 8 disposed above the inlet end of an impregnating tank 10. The plies 4 may be composed of any one of a variety of woven or fibrous sheet materials, such as paper, linen, canvas, fiber glass, etc., and may be the same or combinations of the foregoing in order to provide the desired physical characteristics of the resultant cured sheet material. In the embodiment illustrated in FIG. 1, two plies are employed for forming a laminated base sheet, although the base sheet may consist of a single ply, as well as a greater number of plies than the two illustrated, consistent with the desired thickness and contemplated end use of the sheet material.

The two plies 4 on passing around and downwardly over the idler roll 8 are positioned in superimposed overlying relationship and thereafter pass through the impregnating tank 10 containing a suitable impregnating resin 12. The plies become saturated with the impregnating resin 12 during their travel through the impregnating tank guided by submerged rolls 14. After saturation with the impregnating resin, two saturated plies defining a base sheet 16 emerge from the impregnating tank and pass upwardly over an idler roller 20.

The saturated base sheet 16, after passing over idler roller 20, is extended horizontally beneath a coating device comprising a supply hopper 22 containing a coating mixture consisting of a resin incorporating a controlled quantity of substantially spherically shaped glass beads therein. The coating mixture indicated at 24 is applied to the upper surface of the base sheet and forms a wave or bank adjacent to the entrance of a pair of combining rolls 26 disposed in intimate contact with the surfaces of the base sheet, effecting a combining of the plies and a doctoring and gauging of the coating material 24 into a uniform layer. Suitable side shields 28 are provided adjacent to the ends of the combining rolls 26 for transversely confining the wave or bank of coating material at the entrance to the combining rolls.

The resin impregnated base sheet 16 incorporating the surface coating of the coating mixture 24 on one face thereof is thereafter advanced horizontally into a curing chamber 32, effecting a concurrent curing of the impregnating resin and the coating mixture.

Preliminary to entrance of the laminate 30 comprising the saturated base sheet having the coating on one face thereof into the curing chamber 32, a release liner 34, which is continuously unwound from supply reels 36, is applied to each exposed face surface of the laminate. The release liner 34 may be composed of any suitable inexpensive sheet material which is substantially impervious to the liquid resin saturant and coating and which is either composed of or has been surface treated with a material rendering the surface non-absorbent and non-adherent to the resin impregnant and coating upon completion of the cure thereof. As shown in FIG. 1, the release liners 34 are guided by the combining rolls 26 so as to converge into overlying contact with the upper and lower faces, respectively, of the saturated coated base sheet.

The advancement of the plies forming the base sheet through the previously described steps and the unwinding and application of the release liner to opposed faces thereof, is conveniently achieved by the pulling action imposed on the longitudinal side edges of the laminate by a pair of endless conveyors including two pairs of transversely spaced endless chains 40, 42, having the horizontal opposed flights thereof extending through the curing chamber 32 and disposed in frictional engaging contact against the transverse side edges of the laminate. The engagement of the longitudinal side edges of the laminate by pairs of endless chains serves to support the intervening web of the laminate in a substantially horizontal position during the course of its travel through the curing chamber between an upper bank 44 and lower bank 46 of infrared heating lamps. Each endless chain is driven at the same controlled linear speed, such as by means of drive sprockets 48 located in the output end of the curing chamber and is trained around and supported at its opposite end by idler sprockets 50.

The particular speed of travel of the laminate through the curing chamber is controlled in consideration of the length of the curing chamber, the temperature in the chamber, the particular thickness of the base sheet and coating, the quantity of resin and catalyst present, and the particular rate of gelling and cure of the resins employed. In any event, the foregoing variables dictate the speed of travel of the endless chains in order to effect a substantially complete curing of the resin saturant and coating mixture.

As shown in FIG. 1, the cured laminate or sheet material 54, upon emerging from the curing chamber, can be conveniently wound on a take-up reel 56 in which form it can be transported or stored until time of use. The release liners can be stripped from the faces of the laminate upon emergence from the curing chamber, or alternatively, can be retained as a protective layer and stripped just prior to use.

Figure 2:
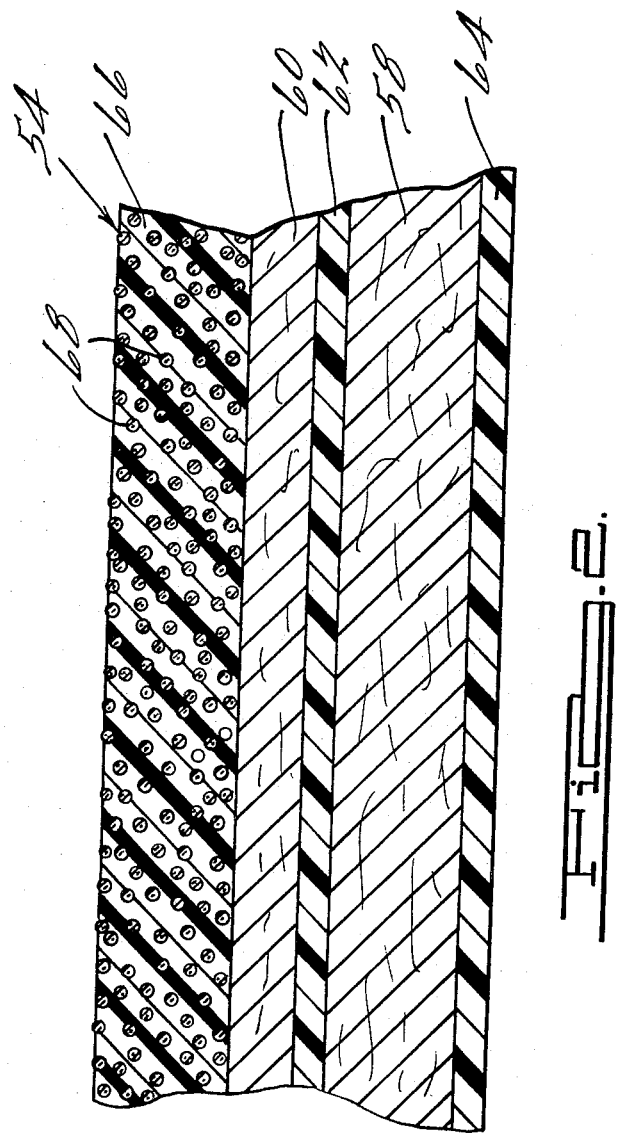
FIG. 2 is a fragmentary magnified transverse sectional view of a composite laminated sheet material incorporating the wear-resistant surface coating on one face thereof.

The resultant cured laminate or sheet material 54 produced in accordance with the apparatus and processing cycle as hereinbefore described is illustrated in FIG. 2. As shown, the laminate 54 consists of a lower ply 58 and an upper ply 60, which are tenaciously united by the saturating resin impregnated in the plies and present as a thin film or layer 62 between the plies and as a residuary layer 64 over the bottom exposed surface of the ply 58. On the upper face surface of the laminate, a coating 66 is tenaciously bonded incorporating a plurality of substantially spherically shaped transparent glass beads 68 distributed uniformly therethrough. The face surface of the upper ply 60 is preferably provided with a suitable imprintation visible through the coating 66 to enhance the appearance of the laminate.

In accordance with the preferred practice of the present invention wherein the saturating resin and the coating resin are concurrently cured, the saturant and coating resins are of the same type and may comprise any one of a variety of thermosetting resins capable of polymerization by addition reactions such as epoxies, polyesters, etc. Preferably, the resins are polyester resins which may be modified by the inclusion of various reactive monomers therein. Polyester resins suitable for use in the process for making the decorative sheet materials having an abrasion-resistant surface are those produced by the reaction of dibasic acids with dihydric alcohols and particularly dibasic acid, such as maleic acid and other unsaturated dibasic acids. Cross-linking of such unsaturated polyester resins can conveniently be achieved by the addition of other unsaturated monomers, such as styrene, vinyltoluene, diallyl phthalate and methylmethacrylate. Fumaric acid is also frequently employed in forming unsaturated polyester resins, while typical dihydric alcohols are ethylene, propylene, dipropylene, as well as certain butylene glycols. Suitable catalysts for this resin system include any one of a variety of peroxide catalysts of the types well known in the art.

The resin impregnant when employed for saturating the base sheet conventionally comprises a liquid polyester devoid of any solid filler. The coating resin employed for forming the wear-resistant surface coating comprises the same polyester resin incorporating therein a controlled amount of substantially spherical, solid transparent glass beads which are of a controlled particle size of generally less than the thickness of the coating applied. In accordance with the discovery comprising the present invention, it has been found that improved abrasion resistance of the surface coating is attained only when the beads are of a substantially spherically shaped configuration as opposed to irregularly shaped particles having sharp edges or corners thereon, such as ground glass particles or powder. In order to achieve a significant improvement in the abrasion resistance of the surface coating, it has been found that the glass beads should be incorporated in an amount of at least about 25 parts by weight based on 100 parts by weight of the resin. Proportions of glass beads of less than about 25 parts per 100 parts resin have been found in some instances to provide only a minimal improvement in the abrasion resistance characteristics of the surface coating and for this reason, such lesser amounts are generally not recommended. On the other hand, the quantity of glass beads can be increased to an extent where the coating consists of a matrix consisting predominantly of glass beads which are tenaciously bonded by a continuous resin matrix. Generally, the upper limit of glass beads is about 300 parts by weight based on 100 parts of resin present.

The particular size of the particles can be varied consistent with the thickness of the surface coating applied. Particularly satisfactory results have been achieved employing glass beads of a size ranging from about 170 mesh (approximately 3.5 mil) to about 325 mesh (1.7 mil). In accordance with a preferred practice, the size of the glass beads are controlled so as to substantially coincide with the thickness of the coating applied to the base sheet.

In addition to achieving a substantial improvement in the abrasion resistance of the surface of decorative plastic laminates, the inclusion of the spherical glass bead filler also enables the attainment of an attractive surface texturing in lieu of a smooth surface finish, which can be achieved by employing quantities of the glass beads in the region of higher concentrations for a given resin content or, alternatively, employing glass beads of a larger size in which portions of the beads protrude above the surface of the resin. It is also possible to achieve surface texturing by employing lesser amounts of glass beads in combination with a resin having a relatively high shrinkage factor on curing, whereby portions of the glass beads are exposed during the cure of the resin.

In order to further illustrate typical compositions suitable for forming the abrasion-resistant surface coating, the following examples are provided. It will be understood that the examples are provided for illustrative purposes and are not intended to be limiting of the scope of the invention as set forth in the subjoined claims.

EXAMPLE I

A liquid surface coating composition suitable for providing an abrasion-resistant surface is as follows:

| Ingredient | Parts by Weight |
| --- | --- |
| General purpose polyester resin* | 40 |
| High viscosity general purpose ortho-phthalate polyester resin** | 60 |
| 170–325 mesh glass beads | 25 |
| Benzoyl peroxide | 1 |
| Styrene | 1 |

*PPG Industries resin RS–50025
**PPG Industries resin RS–510057

EXAMPLE II

A liquid coating composition suitable for forming a surface coating which is both abrasion-resistant and provides a surface texture is as follows:

| Ingredient | Parts by Weight |
| --- | --- |
| General purpose polyester resin* | 100 |
| 70–100 mesh glass beads | 50 |
| Benzoyl peroxide | 1 |
| Styrene | 15 |

*PPG Industries resin RS–50025

In order to further demonstrate the improved abrasion resistance of surfaces of sheet materials incorporating the surface coating of the present invention, tests were conducted pursuant to NEMA specifications to determine the rate of wear of such laminates. In accordance with such NEMA specification, maximum wear permissible is 0.080 grams per 100 cycles as a maximum allowable weight loss due to wear. In one comparison, standard orthophthalate polyester resins incur a weight loss of from about 0.100 to 0.120 grams for 100 cycles. Corresponding tests conducted on laminates incorporating the surface coating applied in accordance with the present invention evidenced a loss of about 0.060 grams per 100 cycles when employing 25 parts of glass beads based on 100 parts resin. Laminates prepared in accordance with the so-called "high pressure" technique generally have a wear rate of from about 0.050 to about 0.058 grams per 100 cycles but such high pressure laminates are very rigid in comparison to the sheet material made in accordance with the present invention which is relatively flexible, enhancing the versatility of use of the sheet material produced. It will be apparent from the foregoing that the present invention provides a flexible sheet material which can be manufactured by a continuous operation and which has substantially improved surface abrasion resistance in comparison to other polyester-type plastic laminates heretofore known. In addition, the method of the present invention also enables a controlled texturing of the surface of the sheet material, enhancing its decorative appearance.

While it will be apparent that the preferred embodiments of the invention disclosed are well calculated to fulfill the objects above stated, it will be appreciated that the invention is susceptible to modification, variation and change without departing from the spirit of the invention.

What is claimed is:

1. A method for making a sheet material having a transparent wear resistant surface which comprises the steps of forming a resilient base sheet by impregnating at least one continuous ply of an indefinite length with a thermosetting impregnating resin, advancing the impregnated said base sheet and continuously applying on at least one face of said sheet a surface coating comprising a thermosetting resin incorporating from about 25 parts to about 300 parts by weight based on 100 parts by weight of said resin of substantially spherically shaped solid glass beads, said glass beads being of a controlled size ranging from a size of about 170 mesh to about 325 mesh corresponding substantially to the thickness of said coating to a size less than the thickness of said coating, and thereafter concurrently curing said impregnating resin and said coating.

2. The method as described in claim 1, wherein said coating is applied in the form of a layer of substantially uniform thickness.

3. The method as described in claim 1, wherein said glass beads are all of a size corresponding substantially to the thickness of said coating.

4. The method as described in claim 1 wherein a plurality of plies are impregnated with said impregnating resin and are positioned in face-to-face overlying relationship prior to curing.

5. The method as described in claim 1 wherein said impregnating resin and said resin of said coating are a polyester resin.

* * * * *

UNITED STATES PATENT OFFICE
CERTIFICATE OF CORRECTION

Patent No. 3,661,673          Dated   May 9, 1972

Inventor(s) John B. Merriam

It is certified that error appears in the above-identified patent and that said Letters Patent are hereby corrected as shown below:

On the cover sheet, under References Cited, insert
-- 2,780,533      2/1957       Hurst        156/279X -- .
Column 2, line 1, "surfaces" should read -- surface -- .  Column 4, line 55, "RS-510057" should read -- RS-50057 -- .

Signed and sealed this 12th day of December 1972.

(SEAL)
Attest:

EDWARD M. FLETCHER, JR.          ROBERT GOTTSCHALK
Attesting Officer                 Commissioner of Patents